United States Patent
Poon (10) Patent No.: US 8,189,730 B2
(45) Date of Patent: May 29, 2012

(54) METHOD AND APPARATUS FOR SYSTEM TIME CLOCK RECOVERY

(75) Inventor: Wai-Leong Poon, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 1569 days.

(21) Appl. No.: 10/260,365

(22) Filed: Sep. 30, 2002

(65) Prior Publication Data

US 2004/0062334 A1  Apr. 1, 2004

(51) Int. Cl.
*H03D 3/24* (2006.01)

(52) U.S. Cl. ......... 375/376; 375/354; 370/503; 348/500

(58) Field of Classification Search ............... 375/376, 375/240.28, 373, 359, 375, 354; 370/503; 348/500
See application file for complete search history.

(56) References Cited

U.S. PATENT DOCUMENTS

| | | | | |
|---|---|---|---|---|
| 5,602,920 A | * | 2/1997 | Bestler et al. | 380/212 |
| 5,699,392 A | * | 12/1997 | Dokic | 375/376 |
| 5,870,002 A | * | 2/1999 | Ghaderi et al. | 331/17 |
| 5,881,114 A | * | 3/1999 | Moon | 375/376 |
| 5,923,220 A | * | 7/1999 | Honma | 331/17 |
| 6,240,152 B1 | * | 5/2001 | Ho | 375/376 |
| 6,674,805 B1 | * | 1/2004 | Kovacevic et al. | 375/240.28 |
| 6,801,591 B1 | * | 10/2004 | Frencken | 375/373 |
| 2003/0020642 A1 | * | 1/2003 | Ely et al. | 341/111 |
| 2004/0156623 A1 | * | 8/2004 | Kato et al. | 386/98 |

* cited by examiner

*Primary Examiner* — Chieh M. Fan
*Assistant Examiner* — Leila Malek
(74) *Attorney, Agent, or Firm* — Faegre Baker Daniels LLP (57) ABSTRACT

Briefly, a system time clock (STC) recovery apparatus includes an STC counter that receives a program clock reference (PCR) signal. The STC recovery apparatus also includes a phase lock loop that generates an STC signal having an STC frequency and a fractional divider that generates a modified STC signal by adjusting the STC frequency of the STC signal such that the modified STC signal is provided to the STC counter. The STC clock recovery apparatus further includes a register, such as any suitable memory, which stores a target frequency value and a source frequency value. The target frequency value is the value of the target frequency for the modified STC signal and the source frequency value is the value of the frequency of the STC signal from the phase lock loop.

25 Claims, 5 Drawing Sheets

METHOD AND APPARATUS FOR SYSTEM TIME CLOCK RECOVERY

FIELD OF THE INVENTION

The present invention relates generally to an audio and video decoding system, and more specifically to a decoding system for decoding an incoming audio stream.

BACKGROUND OF THE INVENTION

In a typical audio and video decoding system, an incoming signal, such as a transport stream, is provided to a demultiplexor. The transport stream includes any type of stream capable of carrying one or more embedded signals of audio, video, data, or a combination thereof. More specifically, a typical transport stream provides a plurality of channels of data similar to the different channels within a television set, wherein the transport demultiplexor demultiplexes the transport stream parsing out a specific channel. More specifically, a typical transport demultiplexor generates an audio signal, a video signal, and a program clock reference (PCR) signal from the transport stream. The audio signal is provided to an audio decoder, such as any device implemented either in hardware or software or a combination thereof, wherein the audio information is converted into audible format. The video information is provided to a video decoder which includes any device, implemented either in hardware, software or a combination thereof, wherein the information from the video stream is decoded and provided to a video output such as a display or a television.

Further within the video decoding system, the program clock reference signal is provided to a system time clock (STC) counter. The STC counter provides timing information to the audio decoder and the video decoder, whereupon the decoder utilizes the timing information with regards to the audio and video signals from the transport demultiplexor, to ensure the synchronization of the audio and video decoder system. Utilizing the example of an MPEG decoding system, the timing information has a frequency base of 27 MHz. The decoding system also requires a frequency signal for audio clocks, wherein the frequency may not necessarily be generatable from a 27 MHz source. Therefore, the decoding system requires separate timing signals having different frequencies.

One common solution is to provide a phase locked loop (PLL) with a single voltage source to generate different frequencies such as audio frequencies for an audio decoder and STC clock frequency, wherein the voltage source provides the PLL the voltage signal that would be adjusted to the second set of frequencies and provided to the STC counter and the decoder, such as found in the Xilleon ™ 220 sold by ATI Technologies, Inc., 1 Commerce Valley Drive East, Markham, Ontario. For instance, the generation of these difference frequencies may be accomplished using one or more frequency adjustors in combination with the PLL. In one example, the PLL output's frequency may be adjusted by any suitable frequency adjustor to generate a different frequency for one of the audio decoder and STC clock frequency. When the transport stream is encoded in an encoding scheme which provides an STC timing counter with a base extension, the PLL generates the STC signal to drive the STC counter having the appropriate frequency to coordinate with the PCR signal. Although, when the transport stream is encoded using an encoding scheme that does not provide for an STC timing counter with a base extension, the PLL is unable to produce proper driving signals for the STC counter and the decoder at the same time. This scenario provides for the possibility of a loss of synchronization between the STC counter and the PCR which thereupon may cause audio and video interruption. In one embodiment, a DirecTV(®) transport stream may provide encoded video data having an encoding scheme such that the prior art decoder would only be able to synchronize and decode the encoded audio and video having the STC timing counter with the base extension.

Another proposed solution is to provide multiple PLL voltage sources to generate the audio frequencies and STC clock frequency. This solution increases manufacturing costs by requiring a separate PLL and also decreases the amount of available on-chip silicon as separate PLLs require a greater amount of silicon area on-chip. Another complication found with video decoding systems is that some transport streams have multiple encoding schemes, whereupon different approaches to the timing of STC counter must be utilized. Therefore, simply providing a system with multiple PLLs may not accommodate an incoming transport stream having several different types of encoded information.

As such there exists a need for an improved audio and video decoding system whereupon multiple timing signals having varying frequencies may be generated utilizing a single PLL and the system may further accommodate different encoded transport streams.

BRIEF DESCRIPTION OF THE DRAWINGS

The invention will be more readily understood with reference to the following drawings wherein.

DETAILED DESCRIPTION OF THE PREFERRED EMBODIMENT

Briefly, a system time clock (STC) recovery apparatus includes an STC counter that receives a program clock reference (PCR) signal. The STC recovery apparatus also includes a phase lock loop (PLL) that generates an STC signal having an STC frequency and a fractional divider that generates a modified STC signal by adjusting the STC frequency of the STC signal such that the modified STC signal is provided to the STC counter. The STC frequency is a frequency that can be used to generate audio clocks. The STC clock recovery apparatus further includes a register, such as any suitable memory, which stores a target frequency value and a source frequency value. The target frequency value is the value of the target frequency for the modified STC signal and the source frequency value is the value of the frequency of the STC signal from the phase lock loop.

Figure 1:
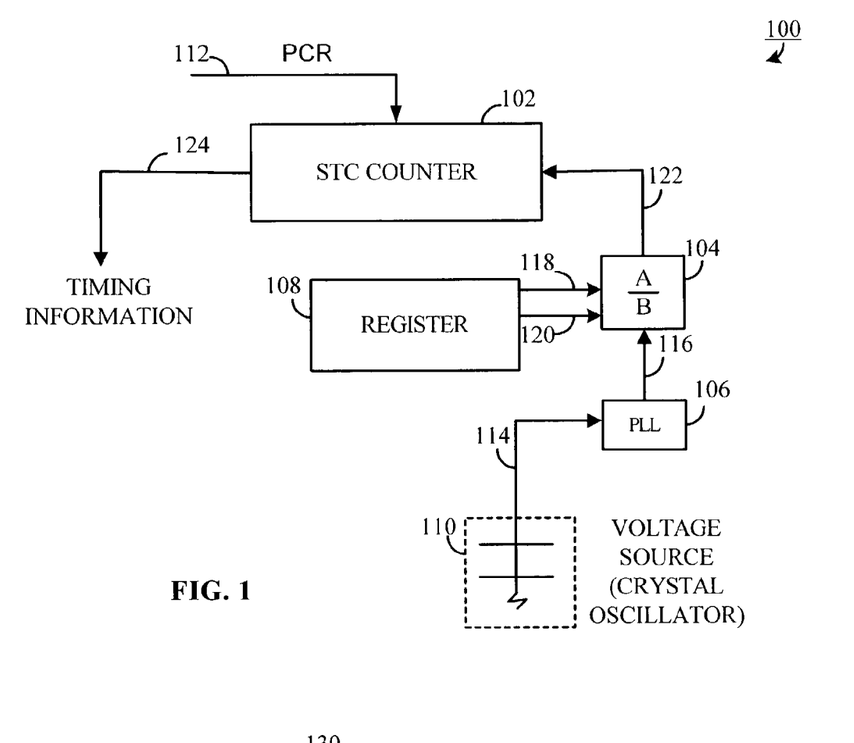
FIG. 1 is a block diagram of a system time clock (STC) recovery system, in accordance with one embodiment of the present invention.

More specifically, FIG. 1 illustrates an STC recovery system 100 including an STC counter 102, a fractional divider 104, a phase lock loop 106, a register 108 and a voltage source 110, such as a crystal oscillator. The fractional divider 104 is discussed below with respect to FIG. 6. The STC counter 102 receives a PCR signal 112 which is a standard incoming audio and video timing signal. The phase lock loop 106 receives a source signal 114 having a source frequency value from the voltage source 110.

The phase lock loop 106 adjusts the frequency of the source signal 114 to generate an STC signal 116 having an STC frequency. The phase lock loop 106 provides the STC signal 116 to the fractional divider 104. The fractional divider 104 also receives from the register 108, a target frequency value 118 and an STC value 120. Thereupon the fractional divider 104 receives the STC signal 116 and generates a modified STC signal 122 which is provided to the STC counter 102. The STC counter 102 generates timing information 124 based upon the PCR signal 112 and the modified STC signal 122. The timing information 124 may be thereupon used by an audio decoder and a video decoder to synchronize timing information with a transport demultiplexor, as discussed below with reference to FIG. 3.

Figure 2:
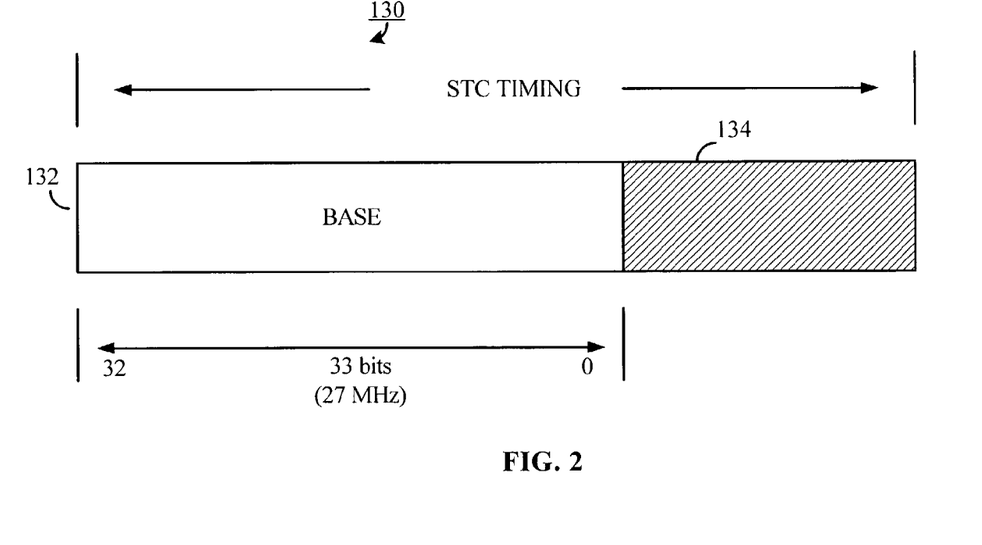
FIG. 2 is a graphical representation of an STC timing counter for a first encoding scheme of an incoming transport stream.

FIG. 2 illustrates a graphical representation of a system time clock timing value 130 utilized by the STC counter 102 for the creation of timing information 124. The STC timing value 130 for a first encoding scheme consists of a base 132 having 33 bits which is incremented by a frequency of 27 MHz. As illustrated in FIG. 2, the STC timing value 130 does not contain an extension 134 but only has the base value 132. Therefore, when the system 100 attempts to drive the STC counter 102 with the source signal 114 from the voltage source 110, the adjustment of the frequency must be based directly on the fractional divider 104 in relation to the phase lock loop 106.

Figure 3:
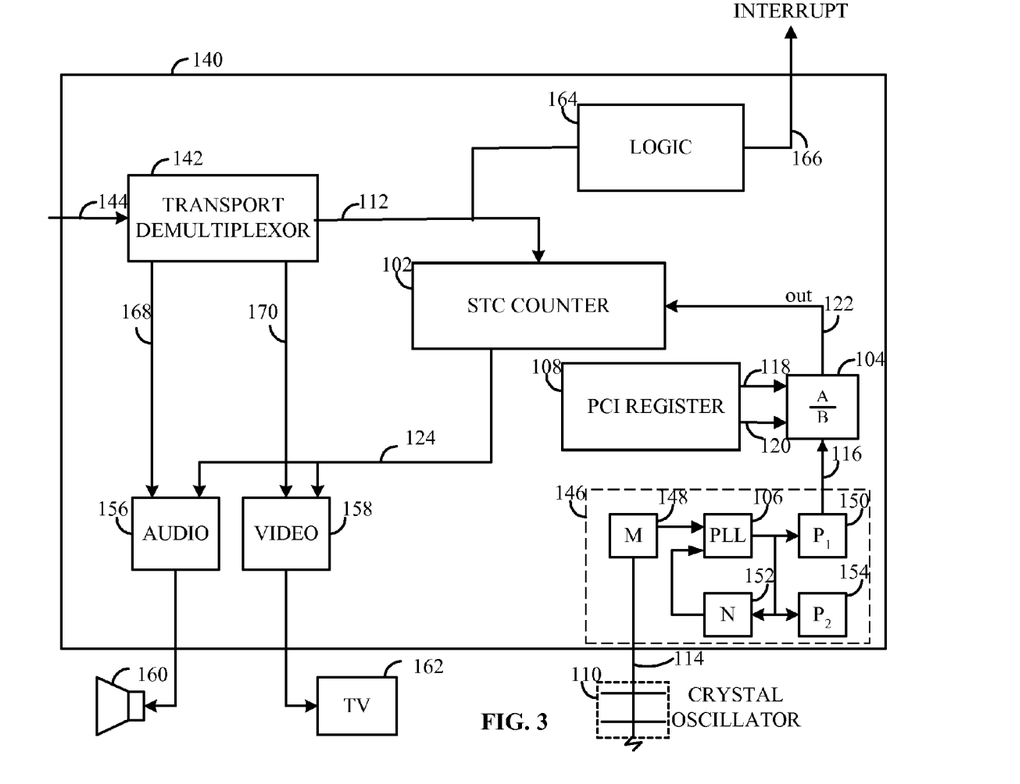
FIG. 3 is a block diagram of an audio and video decoding system, in accordance with one embodiment of the present invention.

FIG. 3 illustrates an audio and video decoder 140, such as an MPEG video decoding system, having a transport demultiplexor 142 that receives a transport stream 144. The system 140 further includes the STC counter 102, the register 108, the fractional divider 104 and the voltage source 110. The voltage source 110, such as a crystal oscillator, provides the source signal 114 to a signal adjustor 146, which includes the phase lock loop 106 in relation to a first frequency adjustor 148, a second frequency adjustor 150, a feedback frequency adjustor 152, and a third frequency adjustor 154.

The system further includes an audio decoder 156 and a video decoder 158, wherein the audio decoder 156 is coupled to a speaker 160, or any other suitable output device, and the video decoder is coupled to a display device 162 such as a television, LCD, CRT, or any other suitable device capable of receiving and displaying video information. The system 140 also includes a logic 164 utilized by the system 140 to generate an interrupt signal 166 in the event of PCR arrival from a transport stream. Similar to FIG. 1, the STC counter 102 receives a modified STC signal 122 from the fractional divider 104 and thereupon provides timing information 124 to the video decoder 158 and the audio decoder 156. The transport demultiplexor 142, upon receiving the transport stream 144, demodulates a specific channel signal out of the transport stream 144 and provides the audio information 168 to the audio decoder 156 and the video information 170 to the video decoder 158. The STC counter 102 also provides the timing information 124 to the decoders 156 and 158 to thereupon provide synchronization of the timing information 124 with respect to the information signals 168 and 170.

Figure 4:
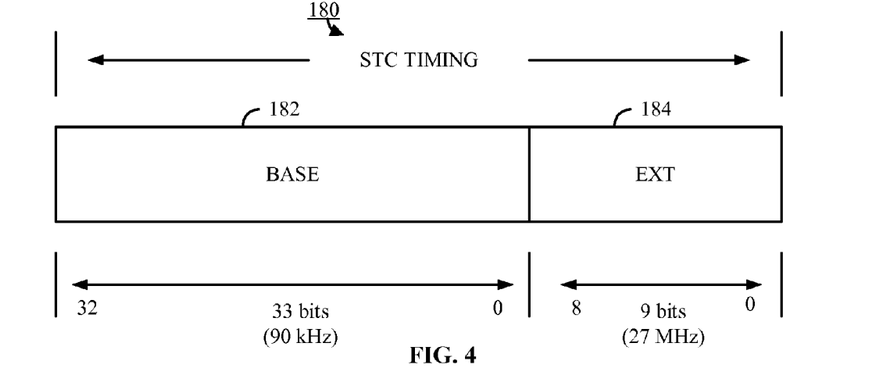
FIG. 4 is a graphical representation of a STC timing counter based on a second encoding scheme of an incoming transport stream.

As the transport stream 144 may provide an incoming signal having one of two different PCR encoding schemes, these different encoding schemes provide for different utilization of a system counter, as illustrated in FIGS. 3 and 4. In the first encoding scheme, the system counter utilizes a 33 bit base 132 without an extension 134, as illustrated in FIG. 2. In a second encoding scheme, the second system counter utilizes a 42 bit string 180 having a 33 bit base 182 and a 9 bit extension 184 as illustrated in FIG. 4. In calculating timing information, for example using the 27 MHz requirement of the MPEG system, when the extension for the system counter is available, the base may be adjusted at a rate of 90 KHz and the extension adjusted at a rate of 27 MHz, wherein for every period the extension 184 is incremented once until the extension reaches a value of 300, thereupon the base 182 itself is incremented by one. As such, the frequency of the extension 184 is 300 times the frequency of the base 182.

As discussed above, the fractional divider 104 may be replaced by a second PLL that generates the modified STC clock at the designated frequency, such as 27 MHz. This approach generates a jitter clean frequency clock to the STC counter 102 at the expense of putting a second PLL on-chip. A jitter free modified STC clock is, however, not necessary for good audio video synchronization performance. Therefore, the advantage of using a fractional divider 104 to generate the modified STC signal 122 for the STC counter 102 is to eliminate the need for a second PLL on-chip. In the above example relating to an MPEG decoded system, a jittery 27 MHz signal would be generated by the fractional divider. This jittery 27 MHz is sufficient to provide high audio video synchronization performance. The elimination of a second PLL by using a fractional divider reduces the total system cost.

When the system counter does not utilize an extension, but only the 33 bit base, the fractional divider 104 must be utilized for the STC counter 102 to be properly synchronized with the 27 MHz frequency of the MPEG system. Therefore, stored in the register 108, the target frequency value 118 for the MPEG system is 27 MHz, designated as element A, and the STC signal frequency value 120 is the frequency of the signal 116 provided after the adjustor 146 from the voltage source 110, designated as element B.

Figure 5A:
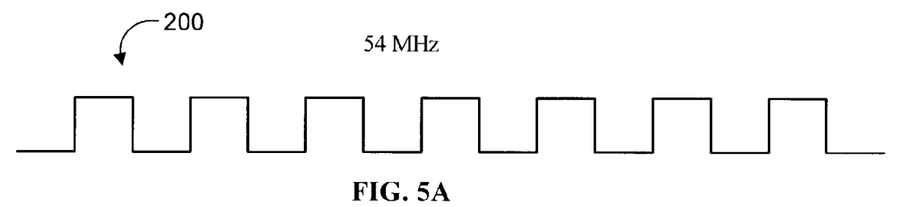
FIG. 5A represents the timing sequence of a 54 MHz signal.

FIG. 5a illustrates a representation of a signal 200 having a frequency of 54 MHz, as illustrates with respect to the above-example of an MPEG decoding system which requires a 27 MHz timing signal. With respect to FIG. 3, signal 200 represents the STC signal 116 which is provided from the phase lock loop 106, as recognized by one skilled in the art the frequency of signal 200 of 54 MHz is for illustration purposes only and not meant to be so limiting herein.

Figure 5B:
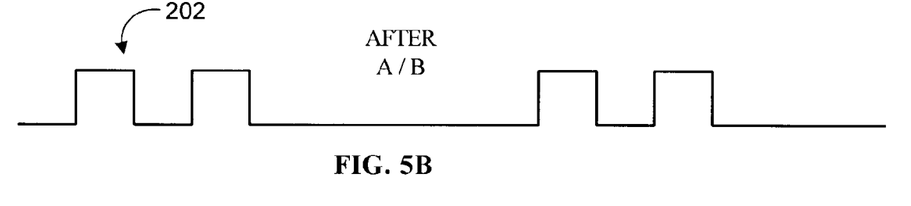
FIG. 5B represents a timing signal after being applied to a fractional divider.

FIG. 5b illustrates a representation of a signal 202 having a frequency of 27 MHz. With respect to FIG. 3, the signal 202 represents the frequency of the modified STC signal 122 as produced by the fractional divider 104. As recognized by one skilled in the art, the signal 202 has a duty cycle of approximately 25 percent and contains a high amount of jitter due to the fractional divider, but this jitter within the modified STC signal does not adversely affect the driving of the STC counter 102 since the synchronization of the STC counter 102 with the audio decoder 156 and the video decoder 158 is not that sensitive.

Figure 5C:
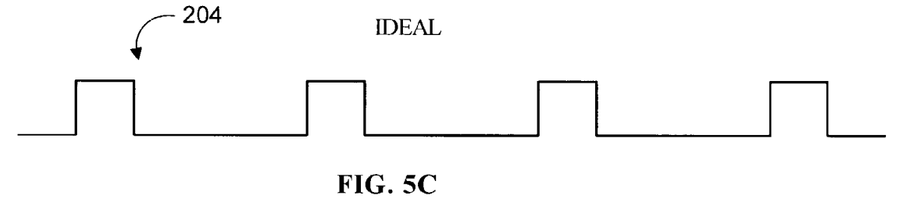
FIG. 5C is a representation of an ideal timing signal.

For reference purposes only, FIG. 5c represents an ideal signal 204 which would be provided to the STC counter in the event a second PLL is utilized. As noted above, this requires an excess amount of silicon area within a chip and adds additional manufacturing costs, therefore the signal 202 of FIG. 5b is a close approximation of the ideal signal 204 such that the STC counter 102 may effectively synchronize the STC counter with the audio decoder 156 and the video 158 so the video decoding apparatus may function properly.

Figure 6:
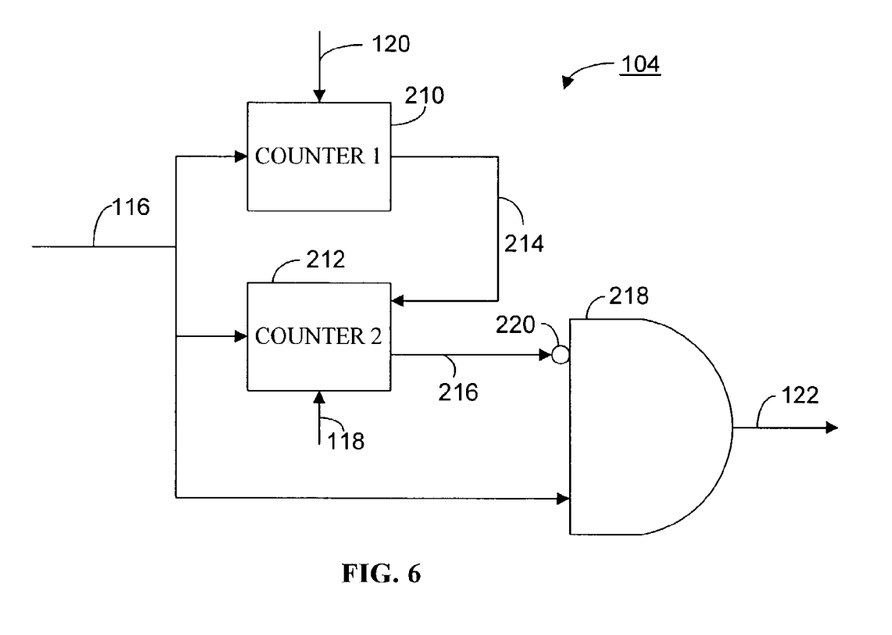
FIG. 6 is a block diagram of the fractional divider, in accordance with one embodiment of the present invention.

FIG. 6 illustrates a graphical representation of the fractional divider 104. As discussed above with respect to FIG. 1, the fractional divider 104 receives the target frequency value 120 and the source frequency value 118, which are stored in the register 108. The fractional divider includes a first counter 210 which receives the source frequency value 118 and a second counter 212 which receives the target frequency value 120. For example, the phase lock loop 106 may generate an STC signal, having a frequency of approximately 35.28 MHz for controlling the STC counter when the incoming video is in the second mode of encoding and when the incoming video is in the first mode of encoding, for example, utilizing the STC timing 130 of FIG. 2, the STC counter is driven by a signal having a frequency of 27 MHz. Therefore, the fractional divider 104 must adjust the incoming STC signal 116 from the 35.28 MHz signal to the modified STC signal 122 having a frequency of 27 MHz.

Using the above frequency values, for illustration purposes only, the target frequency value of 27 MHz is provided to the second counter 212 and the source frequency value of 35.28 MHz is provided to the first counter 210. Each counter 210, 212 also receives the STC signal 116, whereupon the first counter 210 also provides a reset signal 214 to the second counter 212. When the first counter 210 counts to a full cycle of the source frequency, the first counter 212 provides the reset signal 214 to the second counter 212 wherein the second counter resets and generates a finish signal 216 to a clock gate 218 which in one embodiment includes an AND gate having an inverter 220 on the finish signal 216.

In the above example of the operation of the fractional divider, the source frequency value is greater than the target frequency value, so that reset signal 214 from the first counter 210 does not affect second counter 212, such that the second counter 212 provides the finish signal 216 to the clock gate 218 upon reaching a full count equal to the target frequency value. The reset signal 214 resets the counter 212 when counter 1 expires, thus allowing the clock 116 to go through the clock gate. The resulting clock 122 toggles target-frequency-value number of clock cycles every source-frequency-value number of clock cycles such that the clock ratio 122 to 116 is target frequency value to source frequency value. As the fractional divider 104 operates while the incoming video stream in the first encoding scheme, the modified STC signal 122 is generated by the clock gate 218 in response to the inverted 220 finish signal 216 and the STC signal 116. As noted above, the listed frequencies of 35.28 MHz and 27 MHz are for illustration purposes only and meant to be so limiting herein.

Figure 7:
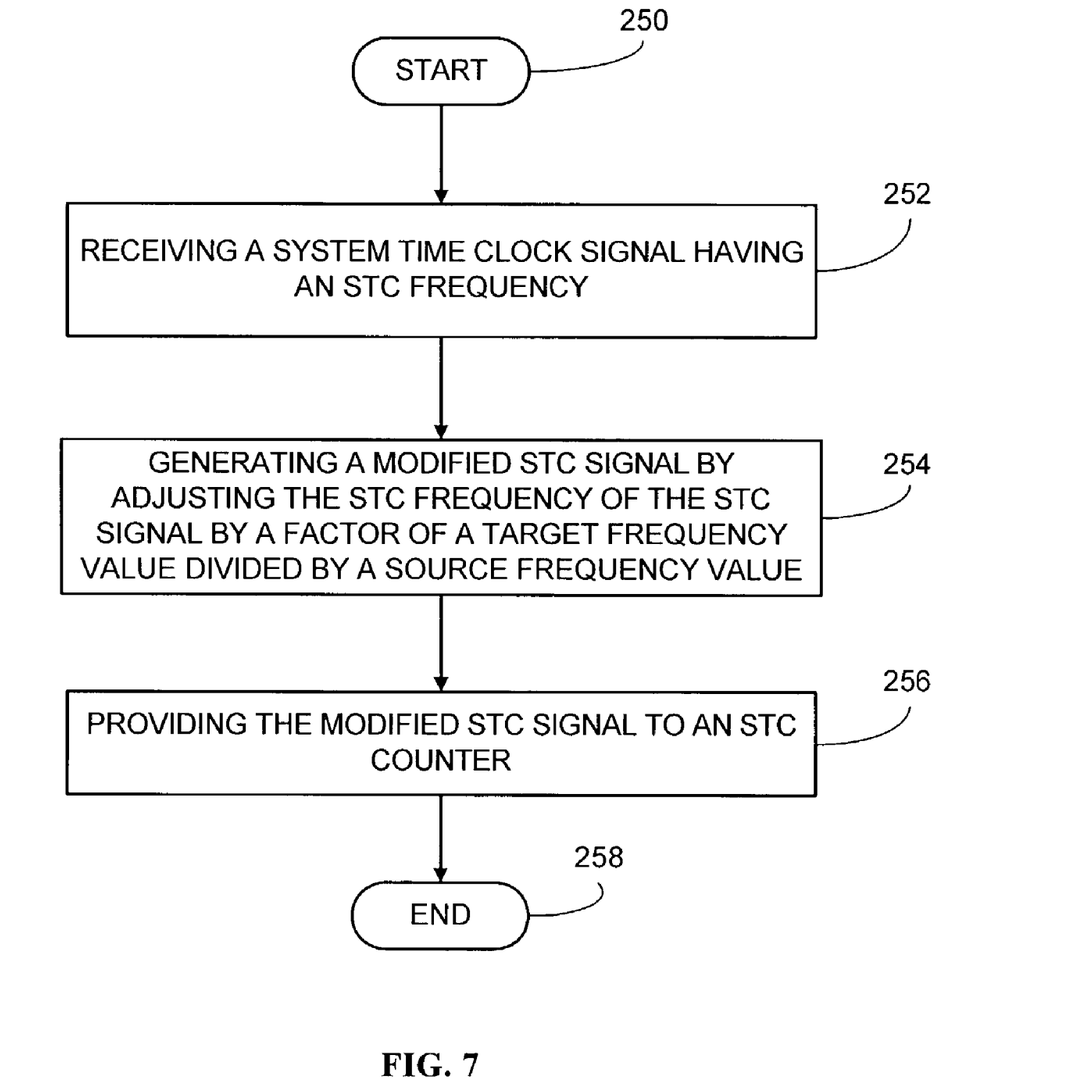
FIG. 7 is a flow chart illustrating the method of a system time clock recovery, in accordance with one embodiment of the present invention.

FIG. 7 illustrates a flow chart for a method for STC recovery. The method begins, step 250 by receiving a system time clock signal having an STC frequency that is not necessary 27 MHz, step 252. For example, with respect to FIG. 1, the STC signal 116 is received by the fractional divider 104, wherein the STC signal 116 has an STC frequency. The next step, 254, is generating a modified STC signal by adjusting the STC frequency of the STC signal by a factor of a target frequency value divided by a source frequency value. For example, as discussed with respect to FIG. 6, the modified STC signal 122 is generated using the target frequency value 118 and the source frequency value 120.

The next step is providing the modified STC signal to an STC counter, step 256. Once again, with respect to FIG. 1, the modified STC signal 122 drives the STC counter 102 to thereupon produce timing information 124, which is used to coordinate audio and video decoders, such as 156 and 158 of FIG. 3. Thus, the system time clock is recovered and the STC counter 102 is driven at a proper frequency to facilitate video and audio decoding, step 258.

Figure 8:
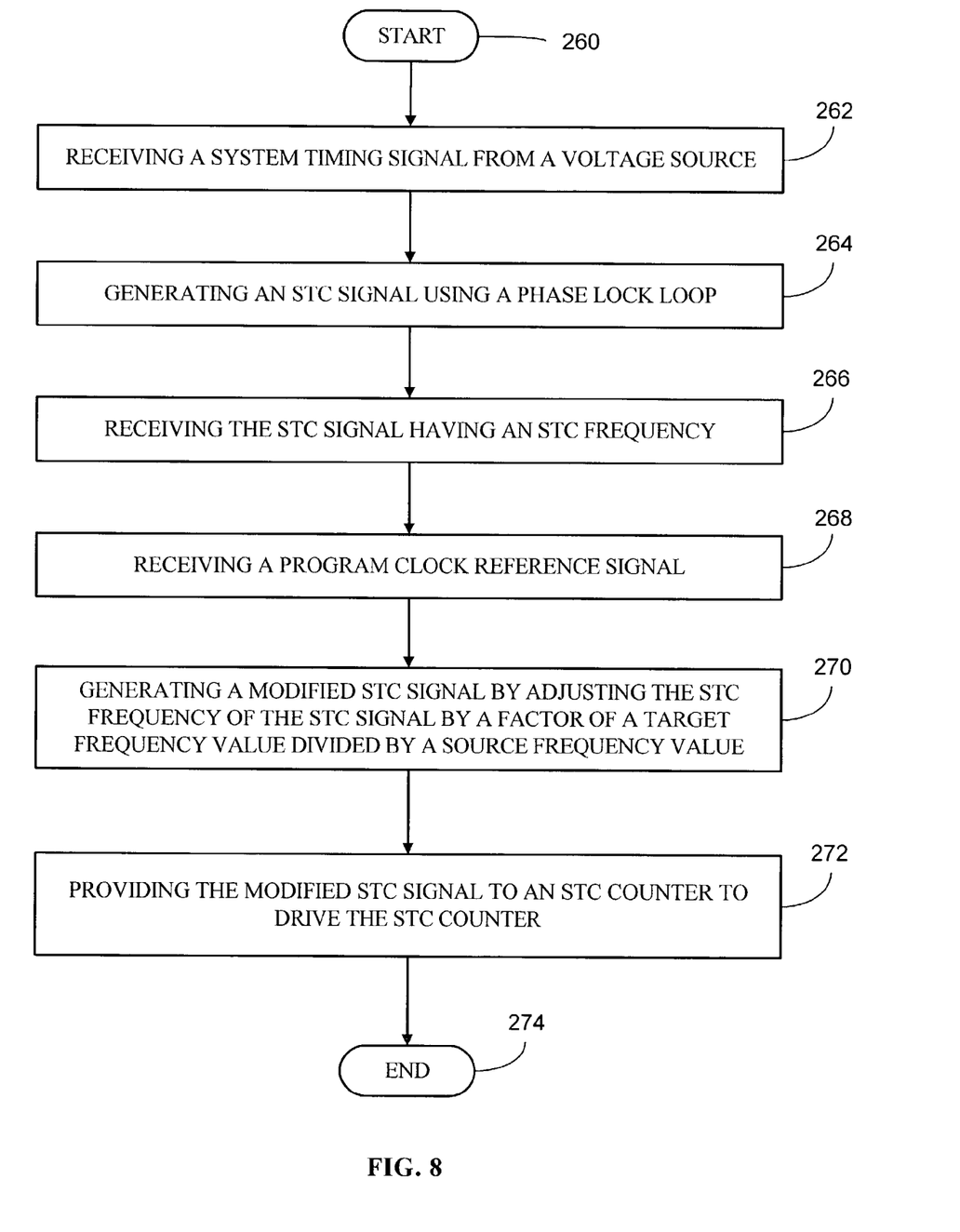
FIG. 8 is a flow chart representing the steps of the method for audio video graphics decoding, in accordance with one embodiment of the present invention.

FIG. 8 illustrates another embodiment of the method for STC recovery. The method begins, step 260, by receiving a system timing signal from a voltage source, step 262. For example, as illustrated with respect to FIG. 1, a voltage source 110, such as a crystal oscillator, provides a system timing signal. Next, step 264, an STC signal is generated using a phase lock loop. As discussed above, the phase lock loop 106 receives the system timing signal 114 to generate the STC signal 116. Thereupon, the next step is receiving the STC signal having an STC frequency, step 266. On one embodiment, the STC signal 116 is received by the fractional divider 104, wherein the STC frequency is determined by the phase lock loop 106.

The method further includes receiving a program clock reference signal, step 268. In one embodiment, the program clock reference signal 112 is provided from the transport demultiplexor 142, which receives the transport stream 144 that contains the encoded video stream. Next, a modified STC signal is generated by adjusting the STC frequency of the STC signal by a factor of a target frequency divided by a source frequency, step 270. As discussed above, the target frequency and source frequency values, 118 and 120, are stored within a register 108 and provided to the fractional divider 104. Moreover, as described above with respect to FIG. 6, the modified STC signal is then generated using the fractional divider 104. Thus, the modified STC signal is provided to an STC counter to drive the STC counter, step 272. In the example above, using the MPEG video encoding system, the modified STC signal 122 has a frequency of 27 MHz. The STC counter 102, when the encoded video stream is encoded in the first encoding mode, must be driven at a frequency of 27 MHz to coordinate timing information 124 with respect to the audio and video decoders, 156 and 158. As such, the phase lock loop 106 generates the STC signal having a frequency for the STC counter 102 when the encoded video is in a second mode and the fractional divider 104 adjusts the frequency of the STC signal 116 to a modified STC signal 122 to coordinate with the video encoded in the first mode. Thereupon, step 274, the method is complete.

The present invention, as disclosed herein, provides for a system time clock recovery method and apparatus whereupon an audio and video decoding system which receives a transport stream having encoded audio and video that is encoded in multiple formats may be readily decoded based on an adjustment of a system timing signal provided to the STC counter. By providing a fractional divider with respect to a phase lock loop that modifies the system signal, a single PLL may be used to drive the audio clocks and the system time counter thereby reducing the amount of real estate required to create and implement the invention within a modern computing system. The STC counter is driven by the modified STC signal, whereupon the STC counter may provide synchronized timing information to audio and video decoders such that a transport stream may be properly decoded and provided to the appropriate output devices. The present invention allows for a video decoding system to readily decode variant forms of encoded data without requiring extra phase lock loops or voltage sources.

It should be understood that the implementation of other variations and modifications of the invention and its various aspects will be apparent to those of ordinary skill in the art, and that the invention is not limited by the specific embodiments described herein. For example, the fractional divider 104 may contain therein specific counters already having designated frequency values and variant counters are then enabled or disabled based on the source frequency value and the target frequency value, thereupon eliminating the register 108 writing specific values to individual counters. It is therefore contemplated to cover by the present invention, any and all modifications, variations, or equivalents that fall within the spirit and scope of the basic underlying principles disclosed herein.

What is claimed is:

1. An apparatus for system time clock (STC) recovery comprising:
   an STC counter operative to receive a program clock reference signal;
   a single phase lock loop operative to generate an STC signal having an STC frequency;
   a fractional divider, external to the single phase lock loop, operatively coupled to receive the STC signal generated by the single phase lock loop, and operative to generate a modified STC signal by adjusting, independently of the program clock reference signal, the STC frequency of the STC signal, wherein the STC counter is operative to receive the modified STC signal; and
   a transport stream decoder operative to process at least a portion of a transport stream based on the modified STC signal.

2. The apparatus of claim 1 further comprising:
   a register operatively coupled to the fractional divider operative to store a target frequency value and a source frequency value, wherein the fractional divider is operative to adjust the STC frequency of the STC signal using the target frequency value and the source frequency value.

3. The apparatus of claim 2 wherein the fractional divider is operative to adjust the STC frequency by the ratio of the target frequency value over the source frequency value.

4. The apparatus of claim 1 further comprising:
   a voltage source operatively coupled to the phase lock loop, wherein the voltage source is operative to provide a source signal having a source frequency; and
   wherein the single phase lock loop is operative to generate the STC signal based on the source signal.

5. The apparatus of claim 4 wherein the voltage source is a crystal oscillator.

6. The apparatus of claim 1, wherein the STC counter is operative to generate timing information for synchronizing information associated with a transport stream at least in response to at least one of the program reference signal and the modified STC signal.

7. An apparatus for system time clock (STC) recovery comprising:
   an STC counter operative to receive a program clock reference signal;
   a signal frequency adjustor operative to receive a system timing signal and operative to generate an STC signal having an STC frequency, the signal adjustor including:
      a first frequency adjustor operative to receive the system timing signal;
      a single phase lock loop external to and operatively coupled to the first frequency adjustor;
      a feedback frequency adjustor external to and operatively coupled to the single phase lock loop;
      a second frequency adjustor external to and operatively coupled to the single phase lock loop, wherein the single phase lock loop, using the first frequency adjustor, the feedback frequency adjustor and the second frequency adjustor, is operative to generate the STC signal having the STC frequency; and
   a fractional divider external to the single phase lock loop and operative to generate a modified STC signal by adjusting, independently of the program clock reference signal, the STC frequency of the STC signal, wherein the STC counter is operative to receive the modified STC signal.

8. The apparatus of claim 7 further comprising:
   a register operatively coupled to the fractional divider, wherein the register is operative to store a target frequency value and a source frequency value, wherein the fractional divider is operative to adjust the STC frequency of the STC signal using the target frequency value and the source frequency value.

9. The apparatus of claim 8 wherein when the program clock reference signal is a first type reference signal, the fractional divider is operative to adjust the system time clock frequency by the ratio of the target frequency value over the source frequency value.

10. The apparatus of claim 9 wherein when the program clock reference signal is a second type reference signal, the target frequency and the source frequency value are equivalent and the signal frequency adjustor is operative to adjust the STC signal.

11. The apparatus of claim 7 further comprising a voltage source operatively coupled to the phase lock loop, wherein the voltage source is operative to generate the system timing signal.

12. The apparatus of claim 11 wherein the voltage source is a crystal oscillator.

13. The apparatus of claim 7, wherein the STC counter is operative to generate timing information for synchronizing information associated with a transport stream at least in response to at least one of the program reference signal and the modified STC signal.

14. A method for system time clock (STC) recovery comprising:
   receiving, external to a single phase lock loop, an STC signal having an STC frequency from the single phase lock loop;
   prior to generating a modified STC signal, receiving a program clock reference signal by an STC counter;
   generating, external to the single phase lock loop, the modified STC signal by adjusting, independently of the program clock reference signal, the STC frequency of the STC signal by a factor of a target frequency value divided by a source frequency value;
   providing the modified STC signal to the STC counter; and
   processing at least a portion of a transport stream based on the modified STC signal.

15. The method of claim 14 further comprising:
   receiving a system timing signal from a voltage source; and
   generating the STC signal based on the system timing signal.

16. The method of claim 14 further comprising:
   receiving a system timing signal from a voltage source; and
   generating the STC signal using a signal frequency adjustor, wherein the signal frequency adjustor includes:
      a first frequency adjustor that receives the system timing signal;
      a phase lock loop coupled to the first frequency adjustor;
      a feedback frequency adjustor; and a second frequency adjustor such that the phase lock loop, using the first frequency adjustor, the feedback frequency adjustor and the second frequency adjustor generates the STC signal having the STC frequency.

17. The method of claim 14 wherein a target frequency value and a source frequency value are stored in a register, wherein the method further comprises:
   providing the target frequency value to a fractional divider; and
   providing the source frequency value to the fractional divider such that the modified STC signal is generated.

18. A method for video graphics decoding comprising:
   receiving a system timing signal from a voltage source;
   generating a system time clock (STC) signal having an STC frequency using a single phase lock loop and a first frequency divider;
   receiving a program clock reference signal by an STC counter;
   generating, external to the single phase lock loop, a modified STC signal by adjusting, independently of the program clock reference signal, the STC frequency of the STC signal by a factor of a target frequency value divided by a source frequency value;
   providing the modified STC signal to the STC counter;
   processing, by a decoder at least a portion of a transport stream based on the modified STC signal.

19. The method of claim 18 wherein the target frequency value and the source frequency value are stored in a register, wherein the method further comprises:
   providing the target frequency value to a fractional divider; and
   providing the source frequency value to the fractional divider such that the modified STC signal is generated.

20. The apparatus of claim 1, wherein the transport stream decoder is an audio decoder.

21. The apparatus of claim 1, further comprising a first frequency adjustor operatively interposed between the single phase lock loop and the fractional divider.

22. The apparatus of claim 21, further comprising a second frequency adjustor operatively interposed between the single phase lock loop and the transport stream decoder.

23. The apparatus of claim 7, further comprising an audio decoder operative to process at least a portion of a transport stream.

24. The method of claim 14, further comprising adjusting, using a first frequency adjustor, the STC frequency of the STC signal prior to generating the modified STC signal.

25. The method of claim 24, further comprising adjusting, using a second frequency adjustor, the STC frequency of the STC signal prior to processing at least the portion of the transport stream.

* * * * *